United States Patent [19]
Magolske

[11] Patent Number: 6,024,023
[45] Date of Patent: Feb. 15, 2000

[54] HOPPER CAR GATE

[75] Inventor: Charles Magolske, Chicago, Ill.

[73] Assignee: Thrall Car Manufacturing Company, Chicago Heights, Ill.

[21] Appl. No.: 09/074,537

[22] Filed: May 7, 1998

Related U.S. Application Data

[60] Provisional application No. 60/045,393, May 8, 1997.

[51] Int. Cl.[7] ...................................................... B60P 1/00
[52] U.S. Cl. ........................................ 105/282.1; 222/559
[58] Field of Search ...................... 49/360, 362; 105/247, 105/248, 250, 253, 280, 282.1, 282.2, 282.3, 294, 299, 305; 222/559, 561

[56] References Cited

U.S. PATENT DOCUMENTS

| | | |
|---|---|---|
| 3,891,783 | 6/1975 | Robertson et al. . |
| 3,902,712 | 9/1975 | Dorer . |
| 3,981,195 | 9/1976 | Forney et al. . |
| 4,186,854 | 2/1980 | Teske . |
| 4,187,881 | 2/1980 | Kull .................................... 137/625.31 |
| 4,344,365 | 8/1982 | Fritz et al. . |
| 4,425,381 | 1/1984 | Walsh . |
| 4,449,649 | 5/1984 | Flannigan . |
| 4,474,311 | 10/1984 | Petrecca . |
| 4,475,672 | 10/1984 | Whitehead . |
| 4,574,989 | 3/1986 | Pole . |
| 4,606,570 | 8/1986 | Neumann . |
| 4,643,475 | 2/1987 | Neumann . |
| 4,793,787 | 12/1988 | Schermutzki . |
| 4,999,033 | 3/1991 | Roberts et al. . |
| 5,046,432 | 9/1991 | Bowler . |
| 5,198,029 | 3/1993 | Dutta et al. . |
| 5,470,893 | 11/1995 | Sinclair-Day et al. .................. 523/205 |

OTHER PUBLICATIONS

Guertin Bros. Coatings and Sealants, Ltd., ISO 9001 Product Brochure, 1996, 15 pages.
Poly Hi Solidur, "TIVAR 88–2 Linings for Railcar", *RailwayAge*, Apr. 1998, p. 21.
Richart, Douglas S., Powder Technology, *Kirk–Othmer Encycl. of Chemical Technology*, 4th Ed. 1993, pp. 635–661.
Rilsan, "Rilsan Coating Techniques," May 1986, pp. 5–39.
Rilsan, Nylon 11 Product Brochure, 1987, pp. 1–9.
Wicks, Jr., et al. *Organic Coatings: Science and Technology*, vol. II, 1994, pp. 230–251.
Ward, Jerry, "Powder Coatings: An Overview," Feb. 1997, 4 pages.

*Primary Examiner*—Mark T. Le
*Attorney, Agent, or Firm*—Fitch, Even, Tabin & Flannery

[57] ABSTRACT

A railway hopper car comprises one or more gates, which have a durable, abrasion-resistant, low-friction coating applied to the upper, load-contacting surface thereof to reduce breakaway opening torque. The railway hopper car is particularly useful in handling heavy loads of bulk materials which have high densities and which compact under load, such as soya meal and hydrated alumina. The preferred coating use on the gate is a polymeric powder paint coating having high impact resistance, as well as high abrasion resistance, at the temperature extremes that may be experienced in the harsh operating environments typically encountered by railway hopper cars. The preferred coating is a food grade material suitable for use in contact with bulk agricultural commodities.

25 Claims, 2 Drawing Sheets

HOPPER CAR GATE

RELATED APPLICATION

This application is based on, and claims benefit of, U.S. Provisional Application Ser. No. 60/045,939 filed May 8, 1997.

BACKGROUND OF THE INVENTION

The present invention relates generally to a railway hopper car for transporting loads of bulk materials. More specifically, the invention relates to a hopper car gate having reduced opening torque. Railway hopper cars are widely used to transport loads of bulk agricultural commodities, such as soya meal, and chemical commodities, such as hydrated alumina, potash, and soda ash. The bulk materials are loaded through the top of the car and unloaded through a gate at the bottom of the car. This gate typically is opened manually by a rack and pinion assembly or other mechanical system to allow the load to drop out beneath the hopper car. Certain loads can be particularly difficult to unload. For example, alumina is heavy and has a tendency to compact during transportation. Soya meal also may tend not to flow after the gate has been opened.

One approach to facilitating unloading of hopper cars has been to provide oversized gates that are about 25% larger than those generally used in the past. The increased size of the gate increases the force experienced on the gate, however, such that opening torque may be unacceptably great. Additionally, new regulations require improved seals on the gate in order to minimize leakage of the load around the sides of the gate, which further contributes to high opening torque.

In the past, efforts to reduce opening torque of railway car hopper gates have attempted to address problems associated with the functioning of the mechanical system used to open the hopper car gate. For example, U.S. Pat. No. 4,475,672 issued to Whitehead addresses the problem of caking and freezing of water mixed with dirt, grain and other materials in the rack and pinion assembly, which can result in jamming of the door. A hopper discharge device is disclosed that is designed both to prevent accumulation of material in the working mechanism and to self-clean. To this end, a gate is provided having one or more inverted channel members on the underside of the gate with each member including a section of roller chain. The edges of the gate rest on either side in a gate guide which is part of a gate support. Wear strips manufactured from anti-friction materials provided on either side of the undersurface of the gate engage the surface of the gate guide on which the gate rests on both sides to help reduce friction as the gate slides open and closed along the gate guide.

In addition to clogging of the gate mechanism, corrosion of the metal parts of the mechanism can increase opening torque. Some gates have employed bushings or other components made of a low friction material such as Teflon in place of rollers to avoid problems associated with corrosion. The hopper car gate mechanism disclosed in U.S. Pat. No. 5,046,432 issued to Bowler addresses the problem of corrosion of the components. This patent states that by providing for a slider means comprised of one or more elongated bodies made of some low-friction composite material, the gate slide will not corrode and is permitted to open and close freely without sticking or jamming.

There remains a need for an improved hopper car gate which can offer consistent and reliable gate operation and discharge of lading without excessive breakaway opening torque even after extended use and exposure to harsh weather and other adverse environmental conditions over its useful life.

SUMMARY OF THE INVENTION

In accordance with the present invention, there is provided a railway hopper car comprising one or more gates with a durable, abrasion-resistant, low-friction coating applied to the upper, load-contacting surface thereof to reduce breakaway opening torque. The coated gate preferably has a breakaway opening torque of not more than about 450 ft. lbs. when installed on a typical hopper car loaded with soya meal and not more than about 1200 ft. lbs. when installed on a typical hopper car loaded with hydrated alumina. The preferred coating is a polymeric powder paint coating, which may comprise a hybrid epoxy/polyester material.

The preferred coating is effective for providing a coating binder with a thickness of about 4 to 5 mils. As used herein, "coating binder" is the polymer portion of a coating film after baking and after crosslinking. The preferred coating binder has a wear index of about 61 mg when using a CS-17 wheel and a wear index of about 600 mg when using an H-18 wheel. Further, the preferred coating binder has a pencil hardness of about 2H, a direct impact resistance of at least about 148 in-lbs and a reverse impact resistance of at least about 148 in-lbs.

The invention is particularly useful in handling heavy loads of bulk materials which have high densities and which compact under load, such as soya meal and hydrated alumina. The invention preferably is embodied in a hopper car having oversized gates but also may be embodied in hopper cars having smaller gates.

DETAILED DESCRIPTION OF THE PREFERRED EMBODIMENT

Hopper Car Gate Arrangement

Figure 1:
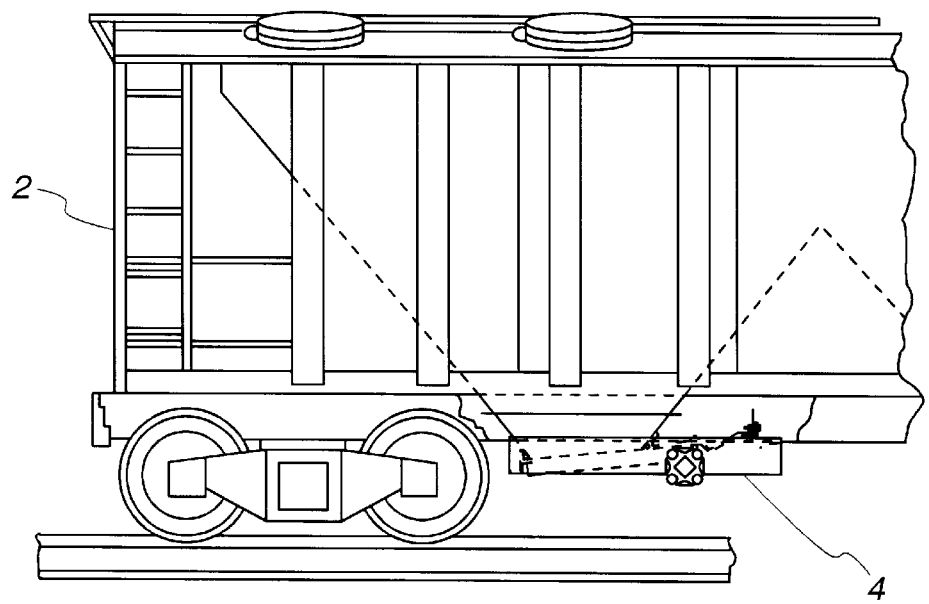
FIG. 1 is a schematic side view of a hopper car showing the chute and gate mechanism.
Figure 2:
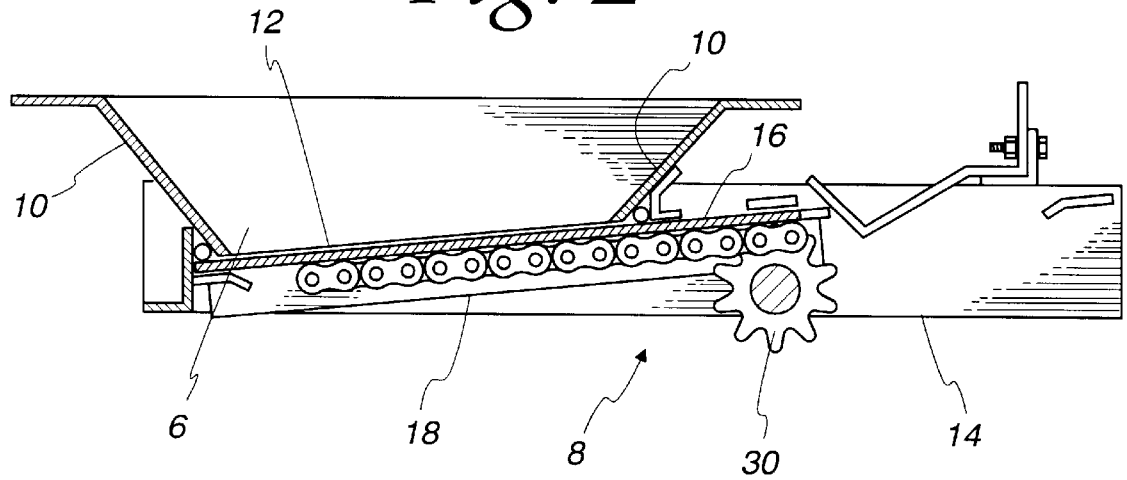
FIG. 2 is a cross-sectional view of the hopper car gate arrangement.
Figure 3:
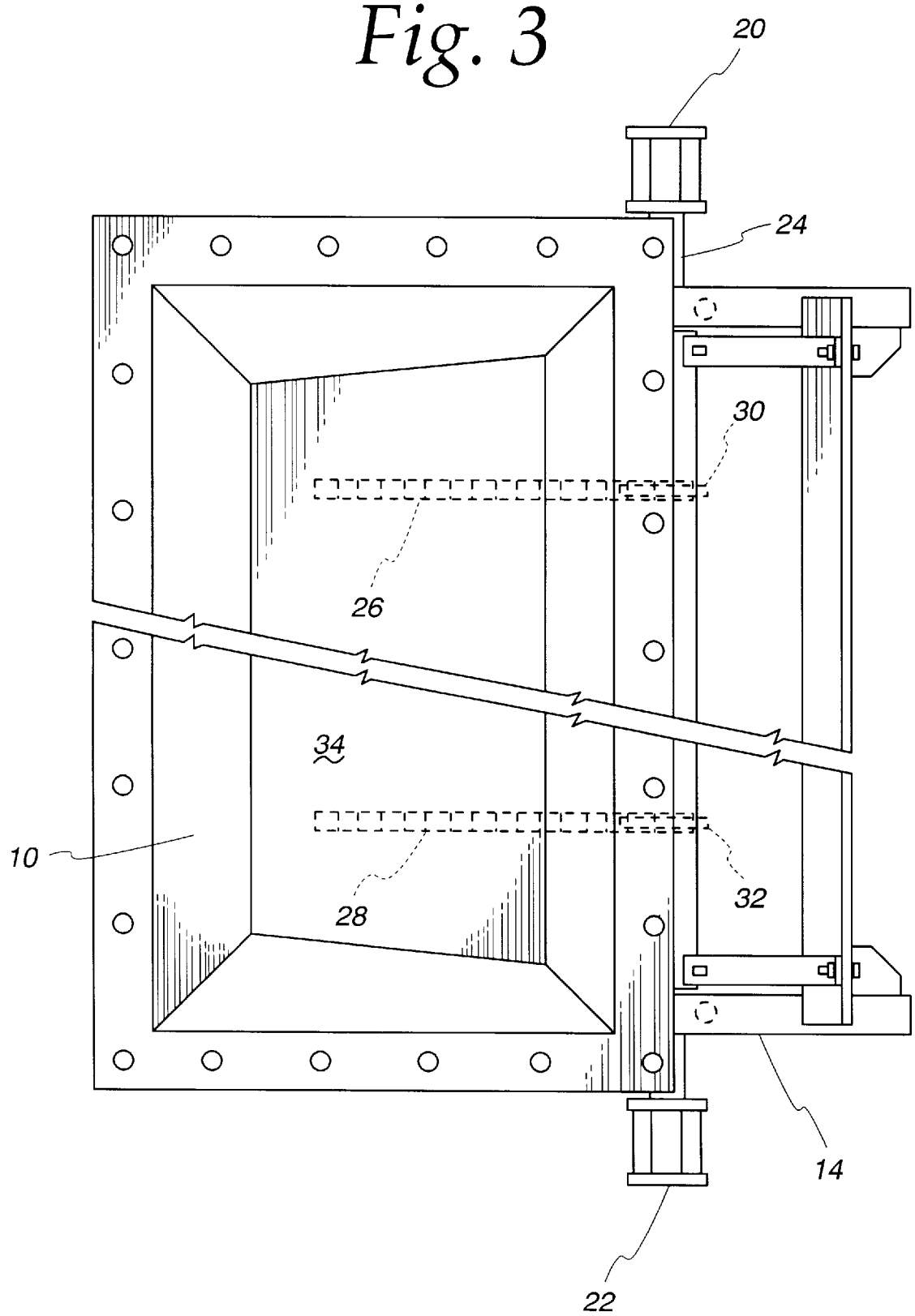
FIG. 3 is a top view of the hopper car gate arrangement.

The present invention generally is embodied in a hopper car 2 having at least one bottom gate arrangement 4 through which the contents of the hopper car 2 are unloaded. In the preferred embodiment, the hopper car 2 has a gate arrangement 4 comprising a chute 6 and a gate mechanism 8. The chute 6 preferably has downwardly inclined walls 10 which define a discharge opening 12 located on the underside of the hopper car 2. The gate mechanism 8 preferably includes a frame 14 fastened to the underside of the hopper car 2 at the discharge opening 12, and a gate 16 may be contained within the frame 14, resting on slider means 18. The gate mechanism 8 is located immediately below the discharge opening 12 such that the gate 16 may be used to open and close the discharge opening 12. A rack and pinion system or other mechanical system may be used as a drive mechanism to open and close the gate. The gate arrangement may comprise other features as may be desired.

In the illustrated embodiment, cranks 20 and 22 are mounted at the ends of a crank shaft 24, which extends transversely across the width of the frame 14. Chains 26 and 28 rigidly attached to the underside of the gate 16 engage sprockets 30 and 32. When a crank 20 and 22 is turned, the crank shaft 24 turns, causing the sprockets 30 and 32 to revolve. As the sprockets 30 and 32 revolve, thereby engaging the chains 26 and 28, the chains 26 and 28 and gate 16 move.

The gate 16 may be slidably opened or closed and preferably is free to move between fully opened and closed positions. The gate 16 provides a bottom for the hopper car 2 such that the contents of the car are in direct contact with the upper surface 34 of the gate 16. As the gate 16 slides open under the contents of the car during unloading, the contents fall past the frame 14 and out of the hopper car 2.

The gate 16 is coated on its upper surface 34 with a durable, corrosion- and abrasion-resistant low-friction coating that is effective for reducing the coefficient of friction and breakaway opening torque associated with sliding the gate 16 open under the contents of the hopper car 2. The low-friction coating also may be applied to other surfaces of the gate arrangement 4 and hopper car 2, as well.

Low-Friction Coating

The low-friction coating preferably is a formulated powder paint coating. Powder paint coatings are known in the art. Such a coating may provide the advantages relating to safe, economical application as compared to solvent- and water-borne coatings.

The preferred coating has high impact resistance, as well as high abrasion resistance, at the temperature extremes that may be experienced in the harsh operating environments typically encountered by railway hopper cars. The preferred coating is a food grade material suitable for use in contact with bulk agricultural commodities.

The coating may be selected from the class of powdered epoxy compounds. Examples of such powder paint coatings are Rilsan® Nylon 11 coatings from Atochem, Inc. and Super-Shield® coatings from Guertin Brothers Coatings and Sealants Ltd. A particularly preferred coating is a hybrid epoxy/polyester coating such as sold by Guertin Brothers under the trade name Super-Shield®H Semi-Gloss Black.

The preferred low-friction coating has a wear index of about 61 mg using a CS-17 wheel and of about 600 mg using an H-18 wheel, a pencil hardness of about 2H, a direct impact resistance of at least about 148 in-lbs and a reverse impact resistance of at least about 148 in-lbs at a binder thickness of about 4 to about 5 mils. In various embodiments, low-friction coating is effective for providing a co-efficient of friction of no greater than about 0.1, 0.2, 0.3, 0.4, 0.5, 0.6, 0.7, 0.8, 0.9 or 1.0 when a gate is opened beneath a full load of soya meal or hydrated alumina. The coated gate preferably has a breakaway opening torque of not more than about 450 ft. lbs. when installed on a typical hopper car loaded with soya meal and not more than about 1200 ft. lbs. when installed on a typical hopper car loaded with hydrated alumina.

The low-friction coating may be applied to the upper surface of the gate and to any other surfaces of the gate or hopper car, in general, as may prove economical or otherwise advantageous. Any conventional technique, such as electrostatic spray or fluidized bed application, may be used to apply the low-friction coating. Application methods are discussed in Zeno W. Wicks et al., *Organic Coatings*, Vol. 2, § 31.5 (1994) and Kirk-Othmer Encyclopedia of Chemical Technology 4th ed., "Powder Technology", Vol. 6, pages 650–653 (1993). After application, the deposited coating should be cured by heating in an oven at a temperature and for a period of time to obtain sufficient crosslinking to provide the described coating properties. Other methods of curing also are applicable.

The following examples illustrate methods for testing the invention and should be understood to be illustrative of, but not limiting upon, the scope of the invention which is defined in the appended claims.

EXAMPLE 1

Test Procedure

A test hopper having a mounted vibrator and containing soya meal and a weight stack were used to simulate a railway hopper car in service. Various modifications to a standard hopper car gate were made in an attempt to lower breakaway opening torque. Specifically, a new seal, both an eight-tooth and ten-tooth sprocket, and standard, powder-coated and stainless steel-lined doors were tested. All tests were performed using a HYLOC model 2022 gate. Additionally, the test gate was modified with a center support, which now is incorporated on newly manufactured HYLOC 2022 gates.

The same test procedure was followed for each modification. This procedure included placing soya meal in the hopper and loading a weight stack on top to simulate a working load of approximately 6 psi. The test stand then was vibrated for one hour with a magnetic vibrator. The various gate configurations tested are indicated in Table 1 below.

TABLE 1

|  | Test #1 (ft-lbs) | Test #2 (ft-lbs) | Test #3 (ft-lbs) | Test Avg. (ft-lbs) |
| --- | --- | --- | --- | --- |
| Original design-no center support (unloaded opening torque 120 ft-lbs) | 620 | 700 | 700 | 673.3 |
| Center support and new seal (unloaded opening torque 100 ft-lbs) | 600 | 568 | 580 | 582.6 |
| Center support, new seal & coated door (unloaded opening torque 100 ft-lbs) | 400 | 340 | 360 | 366.6 |
| Center support, new seal & st/stl lined door (unloaded opening torque 105 ft-lbs) | 420 | 460 | 432 | 437.3 |
| Center support, new seal, 8 tooth sprocket (unloaded opening torque 105 ft-lbs) | 440 | 420 | 440 | 433.3 |
| Center support, new seal, 8 tooth sprocket and coated door (unloaded opening torque 95 ft-lbs) | 300 (16 hour test) | 280 | 280 | 286.6 |

Results

Use of both the stainless steel gate and the powder-coated gate resulted in a lower average breakaway opening torque as compared to the standard, uncoated gate. The powder-coated gate, however, had a smoother surface than the stainless steel-lined gate, and resulted in the lowest breakaway torque in this test. The average opening torque measured for a standard gate was 582.6 ft-lbs, where the average opening torque was 100 ft-lbs without a load. When the gate was coated, all other variables being the same, the opening torque was 366.6 ft-lbs, where the average opening torque was 105 ft-lbs without a load.

EXAMPLE 2

Test Procedure

A test hopper having a mounted vibrator and containing hydrated alumina and a weight stack were used to simulate a railway hopper car in service. Various modifications to a standard hopper car gate were made in an attempt to lower breakaway opening torque. More specifically, both an eight-tooth and ten-tooth sprocket, and standard, powder-coated, epoxy-coated and stainless steel-lined doors were tested. All tests were performed using a HYLOC model 2022 gate.

The same test procedure was followed for each modification. The test procedure included placing hydrated alumina in the hopper and loading a weight stack on top to simulate a working load of approximately 10 psi. The test stand then was vibrated for one hour with a magnetic vibrator. The various gate configurations tested are indicated in Table 2 below.

TABLE 2

|  | Test #1 (ft-lbs) | Test #2 (ft-lbs) | Test #3 (ft-lbs) | Test Avg. (ft-lbs) |
| --- | --- | --- | --- | --- |
| Original design (unloaded opening torque 120 ft-lbs) | 1200 | 1360 | 1392 | 1317 |
| Powder coated door & 10 tooth sprocket (unloaded opening torque 105 ft-lbs) | 1152 | 1120 | 1088 | 1120 |
| Original design with 8 tooth sprocket (unloaded opening torque 110 ft-lbs) | 1120 | 880 | 1120 | 1040 |
| S/stl lined door & 8 tooth sprocket (unloaded opening torque 110 ft-lbs) | 1120 | 1120 | 960 | 1067 |
| Powder coated door & 8 tooth sprocket (unloaded opening torque 105 ft-lbs) | 960 | 880 | 912 | 917 |
| Epoxy coated door & 8 tooth sprocket | 960 | 960 | 992 | 971 |

Results

Although in certain tests the gate opening mechanism was modified with an eight-tooth sprocket, which serves to reduce opening torque, the results still provide an indication of the opening torque associated with various gate surfaces when compared relative to one another. The powder-coated gate, epoxy-coated gate and the stainless steel liner gate had lower breakaway opening torque than the standard gate. The powder-coated and epoxy-coated gates exhibited the lowest breakaway opening torque, however, with the epoxy-coated gate, the paint scratched and marked very easily during the test.

The standard design of the HYLOC gate with a ten-tooth sprocket exhibited an average opening torque of 1317 ft-lbs with a load of hydrated alumina. In comparison, the average opening torque for the test gate was reduced to 1120 ft-lbs when a powder coating was applied to the gate.

Numerous modifications to the hopper car and gate arrangement may be possible to further improve loading, shipping, and/or unloading. Thus, modifications and variations in practice of the invention are expected to occur to those skilled in the art upon consideration of the foregoing detailed description of the invention. Although a preferred embodiment has been described above and illustrated in the accompanying drawings, there is no intent to limit the scope of the invention to this or any other particular embodiment. Consequently, any such modifications and variations are intended to be included within the scope of the following claims. The invention is described further and pointed out by the following claims.

What is claimed is:

1. A railway hopper car for transporting loads of bulk commodities by rail having a bottom gate arrangement comprising a frame, a gate support, a slidably mounted gate and a mechanical system for opening and closing said gate by sliding said gate in substantially linear motion while an inner surface of said gate is in contact with a load of particulate material carried in said hopper, wherein said gate has a hard, smooth inner surface that is coated with a low-friction powder paint coating having sufficient strength, corrosion resistance, durability and abrasion resistance to maintain low-friction engagement with material carried in said hopper during repeated usage in railway service.

2. A railway hopper car in accordance with claim 1, wherein said low-friction coating is effective for providing a coefficient of friction of no greater than about 1.0 when a gate is opened beneath a full load of soya meal and no greater than about 1.0 when a gate is opened beneath a full load of hydrated alumina.

3. A railway hopper car in accordance with claim 1, wherein said low-friction coating is effective for providing an opening torque of not more than about 450 ft-lbs when the car is fully loaded with soya meal and of not more than about 1200 ft-lbs when the car is fully loaded with hydrated alumina.

4. A railway hopper car in accordance with claim 1, wherein said low-friction coating is a formulated powdered paint coating composition which when applied to said gate is effective for providing a coating binder having a wear index of about 61 mg using a CS-17 wheel and of about 600 mg using an H-18 wheel, a pencil hardness of about 2H, a direct impact resistance of at least about 148 in-lbs and a reverse impact resistance of at least about 148 in-lbs at a binder thickness of about 4 to 5 mils.

5. A railway hopper car in accordance with claim 1, wherein said low-friction powder paint coating is selected from a class of powdered epoxy compounds.

6. A railway hopper car in accordance with claim 1, wherein said low-friction coating is effective for providing a coefficient of friction of no greater than about 0.9 when a gate is opened beneath a full load of hydrated alumina.

7. A railway hopper car in accordance with claim 1, wherein said low-friction coating is applied in the form of a powder comprising a plurality of charged particles and then cured to form said low-friction coating.

8. A railway hopper car in accordance with claim 1 wherein said coating comprises a hybrid epoxy/polyester material.

9. A railway hopper car in accordance with claim 1, wherein said low-friction coating is effective for providing a coefficient of friction of no greater than about 0.1 when a gate is opened beneath a full load of soya meal.

10. A railway hopper car in accordance with claim 1, wherein said low-friction coating is effective for providing a coefficient of friction of no greater than about 0.2 when a gate is opened beneath a full load of soya meal.

11. A railway hopper car in accordance with claim 1, wherein said low-friction coating is effective for providing a coefficient of friction of no greater than about 0.3 when a gate is opened beneath a full load of soya meal.

12. A railway hopper car in accordance with claim 1, wherein said low-friction coating is effective for providing a coefficient of friction of no greater than about 0.4 when a gate is opened beneath a full load of soya meal.

13. A railway hopper car in accordance with claim 1, wherein said low-friction coating is effective for providing a coefficient of friction of no greater than about 0.5 when a gate is opened beneath a full load of soya meal.

14. A railway hopper car in accordance with claim 1, wherein said low-friction coating is effective for providing a coefficient of friction of no greater than about 0.6 when a gate is opened beneath a full load of soya meal.

15. A railway hopper car in accordance with claim 1, wherein said low-friction coating is effective for providing a coefficient of friction of no greater than about 0.7 when a gate is opened beneath a full load of soya meal.

16. A railway hopper car in accordance with claim 1, wherein said low-friction coating is effective for providing a coefficient of friction of no greater than about 0.8 when a gate is opened beneath a full load of soya meal.

17. A railway hopper car in accordance with claim 1, wherein said low-friction coating is effective for providing a coefficient of friction of no greater than about 0.9 when a gate is opened beneath a full load of soya meal.

18. A railway hopper car in accordance with claim 1, wherein said low-friction coating is effective for providing a coefficient of friction of no greater than about 0.1 when a gate is opened beneath a full load of hydrated alumina.

19. A railway hopper car in accordance with claim 1, wherein said low-friction coating is effective for providing a coefficient of friction of no greater than about 0.2 when a gate is opened beneath a full load of hydrated alumina.

20. A railway hopper car in accordance with claim 1, wherein said low-friction coating is effective for providing a coefficient of friction of no greater than about 0.3 when a gate is opened beneath a full load of hydrated alumina.

21. A railway hopper car in accordance with claim 1, wherein said low-friction coating is effective for providing a coefficient of friction of no greater than about 0.4 when a gate is opened beneath a full load of hydrated alumina.

22. A railway hopper car in accordance with claim 1, wherein said low-friction coating is effective for providing a coefficient of friction of no greater than about 0.5 when a gate is opened beneath a full load of hydrated alumina.

23. A railway hopper car in accordance with claim 1, wherein said low-friction coating is effective for providing a coefficient of friction of no greater than about 0.6 when a gate is opened beneath a full load of hydrated alumina.

24. A railway hopper car in accordance with claim 1, wherein said low-friction coating is effective for providing a coefficient of friction of no greater than about 0.7 when a gate is opened beneath a full load of hydrated alumina.

25. A railway hopper car in accordance with claim 1, wherein said low-friction coating is effective for providing a coefficient of friction of no greater than about 0.8 when a gate is opened beneath a full load of hydrated alumina.

* * * * *